Nov. 22, 1927. 1,650,499

V. C. DOERSCHUK

SAFETY STEERING WHEEL FOR AUTOMOBILES

Filed Dec. 18, 1926    2 Sheets-Sheet 1

INVENTOR
V. C. Doerschuk.
BY
ATTORNEY

WITNESSES

Nov. 22, 1927.  
V. C. DOERSCHUK  
1,650,499  
SAFETY STEERING WHEEL FOR AUTOMOBILES  
Filed Dec. 18, 1925  
2 Sheets-Sheet 2
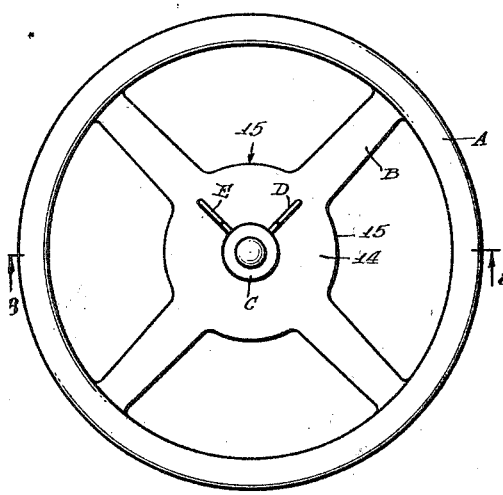
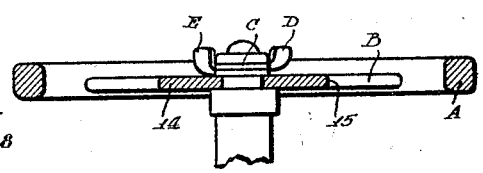
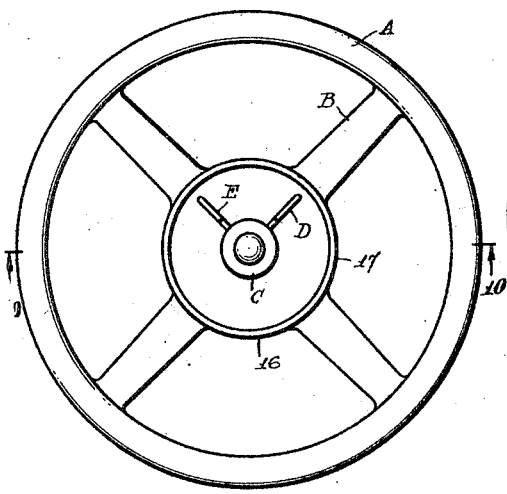
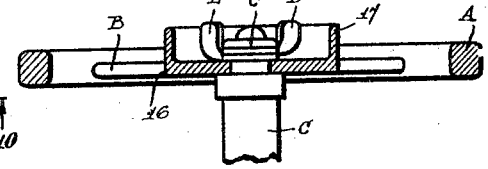
INVENTOR  
*V. C. Doerschuk.*  
BY  
ATTORNEY Patented Nov. 22, 1927.

1,650,499

UNITED STATES PATENT OFFICE.

VICTOR C. DOERSCHUK, OF MASSENA, NEW YORK.

SAFETY STEERING WHEEL FOR AUTOMOBILES.

Application filed December 18, 1926. Serial No. 155,698.

This invention relates to steering wheels for motor vehicles and comprehends improvements in the construction of the wheel which render the steering operation safer by precluding the possibility of catching the fingers between the spokes of the wheel and the spark and throttle control levers.

In the majority of automobile or other motor vehicle steering wheels, the throttle and ignition controlling levers are mounted on the steering column above the steering wheel and usually these levers project radially behind the juncture of the spokes with each other and with the hub. It has been noted by actual experience that the driver in many instances grasps the spoke or spokes of the steeering wheel and inadvertently the hand slips inwardly on the spoke so that when it becomes necessary to turn the steering wheel, one or more of the fingers may be caught between the ignition and throttle controlling levers. In an emergency this may cause a serious accident or injury to the fingers and possibly result in breaking of the levers. In order, therefore, to overcome the above-recited objections, the present invention specifically contemplates the provision of means formed either separately or integrally with the steering wheel, which prevents and positively precludes the catching of the fingers between the controlling levers and the steering wheel spokes.

The invention furthermore aims to provide an improved steering wheel for automobiles or other motor vehicles, which is comparatively simple in its construction, inexpensive to manufacture, and which is highly efficient in its purpose.

With the above recited and other objects in view, reference is had to the following specification and accompanying drawings in which there is exhibited certain examples or embodiments of the invention which are in no way intended as limitations upon the scope of the appended claims as it is to be clearly understood that variations and modifications which properly fall within the scope of said claims may be resorted to when found expedient.

In the drawings—

Fig. 7 is a plan view of a still further form of the invention;

Fig. 8 is a sectional view therethrough taken approximately on the line 8—8 of Fig. 7;

Fig. 9 is a plan view of another form of the invention;

Fig. 10 is a sectional view therethrough taken approximately on the line 10—10 of Fig. 9.

In all of the forms of the invention illustrated, A is the outer rim of the steering wheel; B the spokes; C the steering column, and D and E the throttle and ignition control levers.

Figure 1:
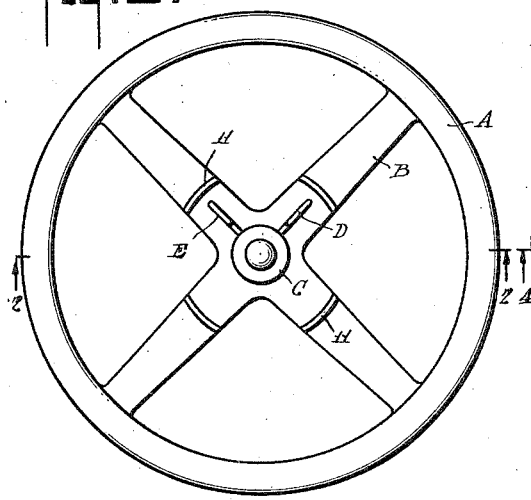
Figure 1 is a plan view illustrating a steering wheel constructed in accordance with the invention.
Figure 2:
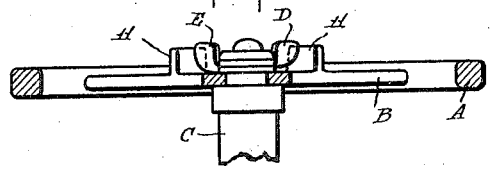
Fig. 2 is a sectional view therethrough taken approximately on the line 2—2 of Fig. 1.

In the form of the invention illustrated in Figs. 1 and 2, the improvement constituting the invention consists in providing on each spoke at a point between the rim and the steering column C, an upstanding lug 11 which is disposed radially beyond the outer extremity of the ignition and throttle control levers. This prevents the operator's hand when grasping the spokes to steer the vehicle, from moving radially inward to a point where the fingers may accidentally be caught between the levers D and E and the spokes B of the steering wheel.

Figure 3:
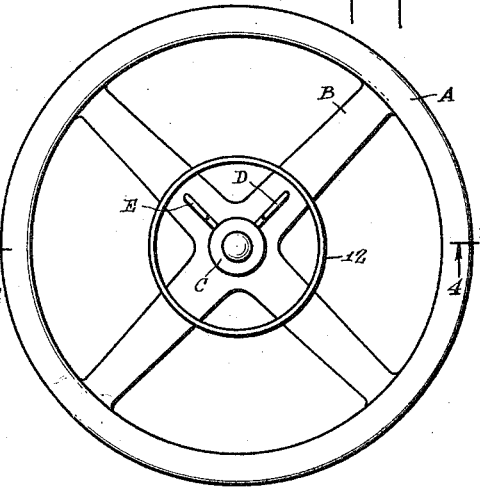
Fig. 3 is a plan view of another form of the invention.
Figure 4:
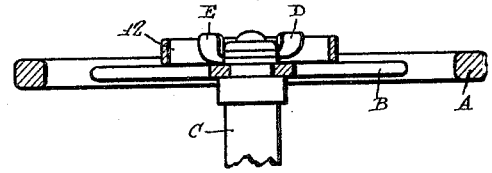
Fig. 4 is a sectional view therethrough taken approximately on the line 4—4 of Fig. 3.

In the form of the invention illustrated in Figs. 3 and 4, the means for accomplishing the purpose of the invention consists in providing a ring or annulus 12 on the spokes between the rim and the steering column, which ring or annulus is concentric with the rim A and is disposed radially beyond the outer extremities of the levers D and E.

Figure 5:
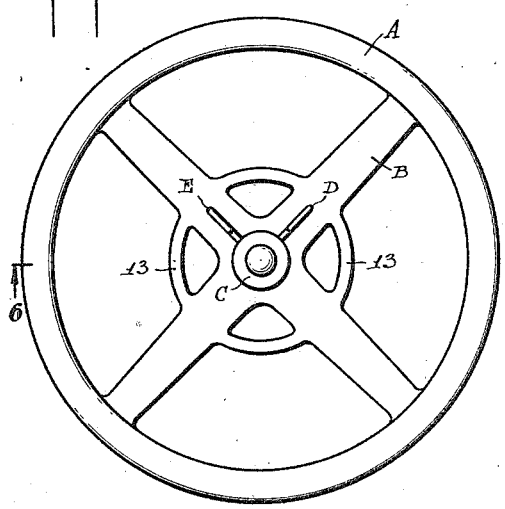
Fig. 5 is a plan view of a further form of the invention.
Figure 6:
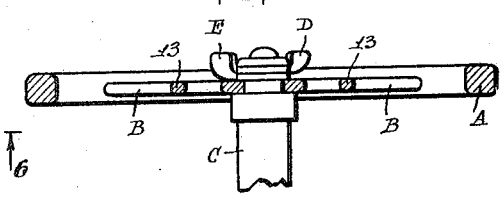
Fig. 6 is a sectional view therethrough taken approximately on the line 6—6 of Fig. 5.

In the form of the invention illustrated in Figs. 5 and 6, the invention consists in providing a second or inner rim 13 either integral with or separate from the spokes, the inner rim being disposed between the outer steering wheel A and the steering column, but of a diameter to be disposed radially beyond the outer extremities of the levers D and E.

In the form of the invention illustrated in

Figs. 7 and 8, the invention consists in providing the spokes B with a connecting web 14, preferably integral therewith and of a diameter to dispose the outer periphery 15 beyond the free extremities of the controlling levers D and E.

In the form of the invention illustrated in Figs. 9 and 10, a cup-shaped means 16 is formed either separately or as an integral part of the spokes B, with its upstanding marginal rim 17 of a suitable diameter to extend beyond the free terminals of the controlling levers D and E. In connection with this form and the forms illustrated in Figs. 1 and 3, the means also serves to prevent accidental engagement of the coat sleeve with the controlling levers D and E, so that disruption of the setting of said levers by accident is practically obviated.

What is claimed is:

1. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a lug formed on each spoke.

2. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a concentric rim on the spokes.

3. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a concentric upwardly projecting rim on the spokes.

4. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a concentric rim formed as a part of the spokes.

5. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a web joining the inner ends of the spokes with the periphery of said web disposed radially beyond the outer free ends of the control levers.

6. In a steering wheel for automobiles having ignition and throttle control levers on the upper side, means on said wheel for preventing the catching of the fingers between the levers and the steering wheel spokes, said means comprising an abutment disposed between the outer end of the lever and the rim of the steering wheel, said abutment being in the nature of a cup-shaped member at the inner end of the spokes and within the confines of which the control levers are arranged.

VICTOR C. DOERSCHUK.